United States Patent Office 3,282,442
Patented Nov. 1, 1966

3,282,442
REMOTE CONTROL MANIPULATORS
William H. Biggley and Ronald C. Culshaw, Deep River, Ontario, Canada; Betty Anne Biggley, administrator of William H. Biggley, deceased, assignors to Atomic Energy of Canada, Limited, Ottawa, Ontario, Canada
Filed June 23, 1964, Ser. No. 377,293
6 Claims. (Cl. 214—1)

This invention relates to remotely controlled manipulating devices.

The invention is exemplified below in connection with a remote welding tool, but it will be evident that the fundamental principles of the invention are equally applicable to the remote manipulation of other instrumentalities.

The apparatus consists of a master unit and a slave unit, with these units so interconnected that any movement applied by an operator to the master unit is automatically and faithfully followed by the slave unit.

When the invention is applied to the manipulation of a remote welding tool, it is convenient for the master unit to be a real welding tool rather than a dummy. The operator controls the master unit by actually making a weld in a work piece identical with the work piece on which the slave tool is acting. By this method, the operator is able to use the tool in a natural manner. As a result the performance of both tools (master and slave) complies with the necessary standard of workmanship.

One practical application of a remote welding tool operating in accordance with the present invention resides in the repair of the internal parts of apparatus in a location where it is impracticable or impossible to bring an operator to the site of the damaged part. An example of such an inaccessible structure is the interior of a nuclear reactor.

One form of remote welding tool is illustrated in the accompanying drawings, by way of example of the invention. It is to be understood that the invention in its broad scope is not restricted to the specific details of this embodiment, being defined by the appended claims.

In the drawings:

FIGURE 6a is a smaller scale side view of the upper part of the master unit, showing the parts in a different position from that of FIGURE 2 and demonstrating the reach motion of the unit;

FIGURE 6b is a similar side view of the lower part of the slave unit showing the parts in a position corresponding with FIGURE 6a;

FIGURE 16 is an enlarged view of the pedestal mounting of the master unit;

Figure 1:
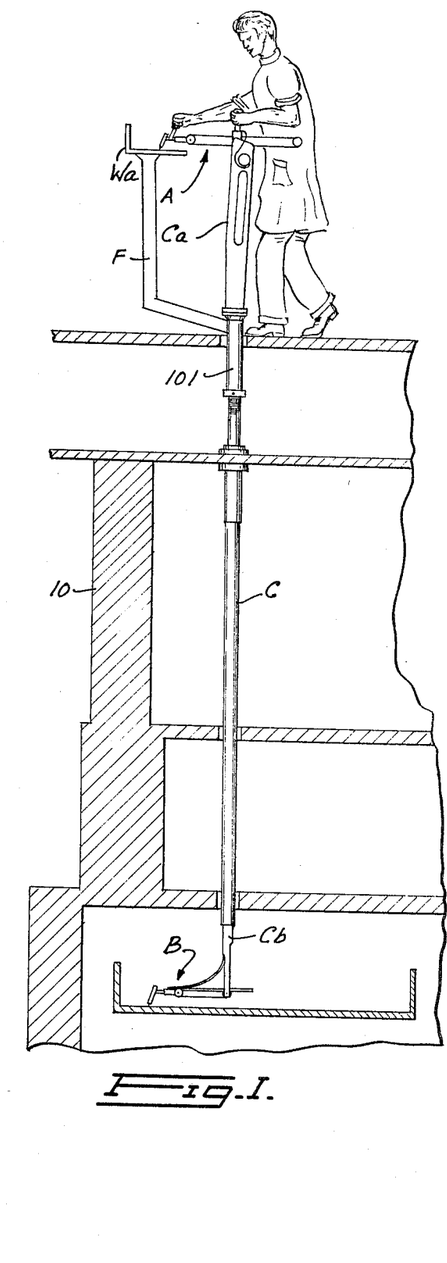
FIGURE 1 is a small scale, diagrammatic view of the overall apparatus.
Figure 1B:
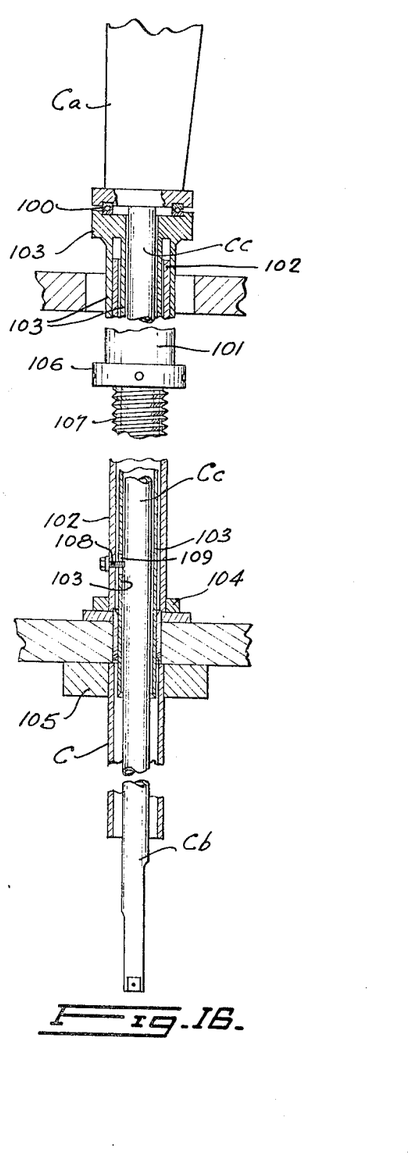

FIGURE 1 shows diagrammatically a part of a structure 10 assumed to be a nuclear reactor or other piece of equipment, to the interior of which access is restricted. Internal damage to such structures can conveniently be repaired by use of a remote welding tool operating in accordance with the principles of the present invention. As shown, the operator controls a master welding unit A, and every action he makes with the tool of this unit in relation to a work piece Wa is followed faithfully by a tool of a slave unit B on the actual work Wb. The particular nature of the work to be welded has not been shown in any detail, since such details are not germane to the present invention. Work piece Wa is mounted on a frame F attached to member 103 (later described).

The units A and B are connected together by mechanism housed in an elongated tubular casing C. The nature of this control mechanism will become apparent from the specific description of the parts which follows.

*Slave unit structure*

It will be convenient to begin the description by a discussion of the slave unit B, in order to demonstrate the motions that it is required to carry out, and then to examine the master unit and the control mechanism to gain an appreciation of the manner in which these results are achieved.

Figure 3:
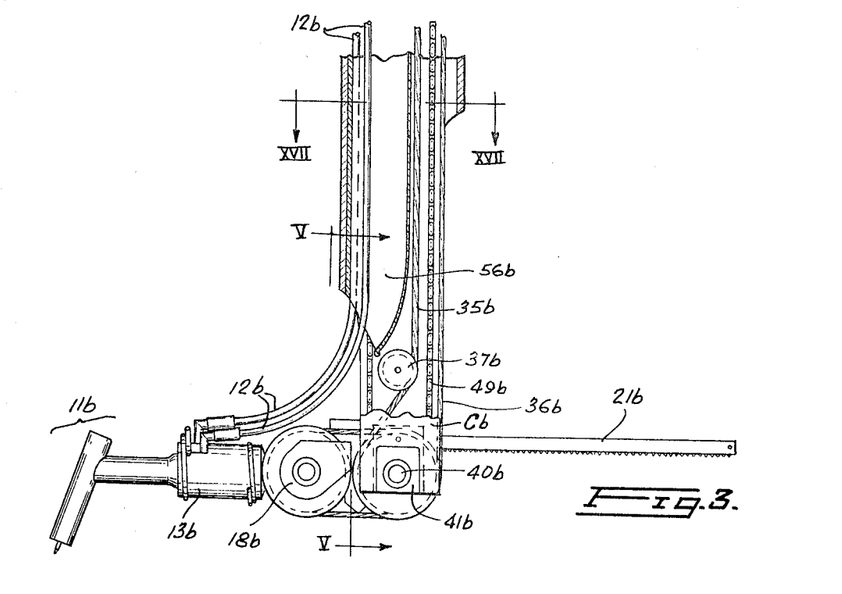
FIGURE 3 is a side view of the slave unit of the apparatus.

The slave unit B is shown in side view in FIGURE 3 as consisting of a welding head 11b to which gas, electric power and cooling water cables 12b are connected and which is mounted on an insulating mounting 13b. These parts are all conventional. The mounting 13b is pivotally supported on a stub shaft 14b (FIGURE 10) which terminates in a forked end 15b (FIGURE 11) supporting a pair of rollers 16b and being itself supported by pins 17b extending inwardly from an outer casing structure 18b. Casing 18b includes a central upstanding block 19b by which it is secured by screws 20b to a slider 21b. The slider 21b is provided on its lower surface with a toothed rack 22b and engages rollers 23b with its upper surface.

Figures 10, 11, 12, 13, 14:
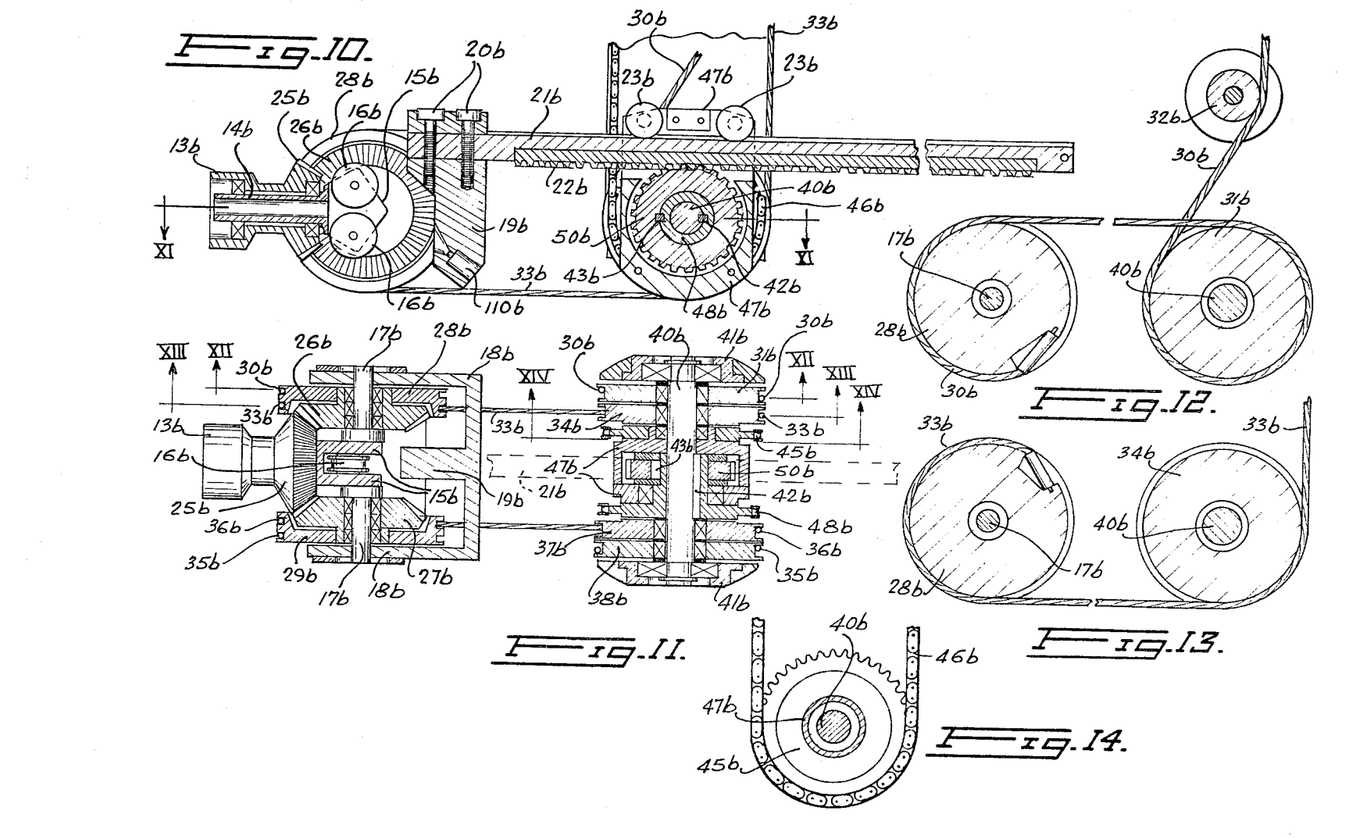
FIGURE 10 is a longitudinal cross sectional view of the main working parts of the slave unit.
FIGURE 11 is a view taken on the line XI—XI in FIGURE 10.
FIGURE 12 is a view taken on the line XII—XII in FIGURE 11.
FIGURE 13 is a view taken on the line XIII—XIII in FIGURE 11.
FIGURE 14 is a section taken on the line XIV—XIV in FIGURE 11.

Returning to a consideration of the tool head 11b, the insulating member 13b is provided at its end with a bevel pinion 25b which meshes with a pair of bevel gears 26b and 27b pivotally mounted on the pins 17b. Secured to the gears 26b and 27b are discs 28b and 29b, respectively, each disc being formed with a pair of peripheral grooves arranged side by side. As best seen in FIGURE 12, a first cable 30b is secured at one end to lie in the outer groove of the disc 28b, to extend around an aligned groove in a pulley disc 31b and then around an idler pulley 32b, to be connected at its upper end to a corresponding cable of the master unit, as will be explained below. As best seen in FIGURE 13, a second cable 33b is anchored at one end to lie in the inner groove of the disc 28b and then extend around a further disc 34b before ascending to the master unit. Note that cables 30b and 33b extend in opposite senses around the disc 28b. Similar cables 35b and 36b (FIGURE 11) lie in the grooves of the second disc 29b to extend around such disc in opposite senses and then pass around pulley discs 37b, 38b and 39b (FIGURE 18) before extending upwardly towards the master unit.

The pulley discs 31b, 34b, 37b and 38b are all freely and independently mounted on bearings on a pin 40b, the ends of which pin are supported in bearings in end plates 41b that are secured to the bottom end of an inner tubular casing Cb (FIGURE 3). Freely rotatably mounted on the pin 40b is a first sprocket wheel 45b (FIGURES 11 and 14) driven by a chain 46b. The sprocket wheel 45b is secured to a frame 47b (see also FIGURE 20) which supports the rollers 23b and thus determines the direction of extent of the slider 21b. Keyed to the pin 40b by a key 42b is a second sprocket wheel 48b driven by a chain 49b (FIGURE 19) and keyed to the sprocket wheel 48b by a key 43b is a pinion 50b meshing with the rack 22b.

*Slave unit motions*

The welding head 11b is capable of five motions. These are:

(1) A twist motion.
(2) A wrist motion.
(3) An elbow motion.
(4) A reach motion.
(5) And an azimuth rotation of the entire slave unit.

The last of these motions can conveniently be dealt with first. The whole slave unit is trained in azimuth by rotation of the inner casing Cb about its longitudinal axis. This motion is communciated to the end plates 41b and hence to the pin 40b and all the parts mounted thereon.

The reach motion (FIGURES 6b and 19) is caused by operation of the chain 49b, pinion 50b and rack 22b.

The elbow motion (FIGURES 7b and 20)—namely rotation of the head 11b about the axis of pin 40b—is caused by operation of the chain 46b, acting through sprocket wheel 45b and frame 47b on the slider 21b.

The wrist motion (FIGURES 8b and 18) comprises rotation of the head 11b about the axis of pins 17b, and is brought about by the simultaneous operation of the cables on both sides of the center line of the unit. For example, if cables 30b and 35b are tensioned simultaneously (while cables 33b and 36b are simultaneously allowed to pay out), the discs 28b and 29b are synchronously rotated clockwise (as seen in FIGURES 10, 12, 13), so that the gears 26b, 27b, pinion 25b and stub shaft 14b are all similarly rotated clockwise to elevate the head 11b. Conversely, a reversal of the travel of the cables will lower the head 11b.

The twist motion (FIGURES 9b and 18) comprises rotation of the head 11b about the axis of the stub shaft 14b and is brought about by equal travel of the cable pairs in opposite senses, that is, rotation of disc 28b clockwise and rotation of disc 29b the same amount anticlockwise, or vice versa. Pinion 25b is thereby rotated about its own axis, while remaining unchanged in location.

In practice, the actual motion of the head 11b will often consist of a compound of two or more of the individual motions just described.

Figures 6A, 6B:
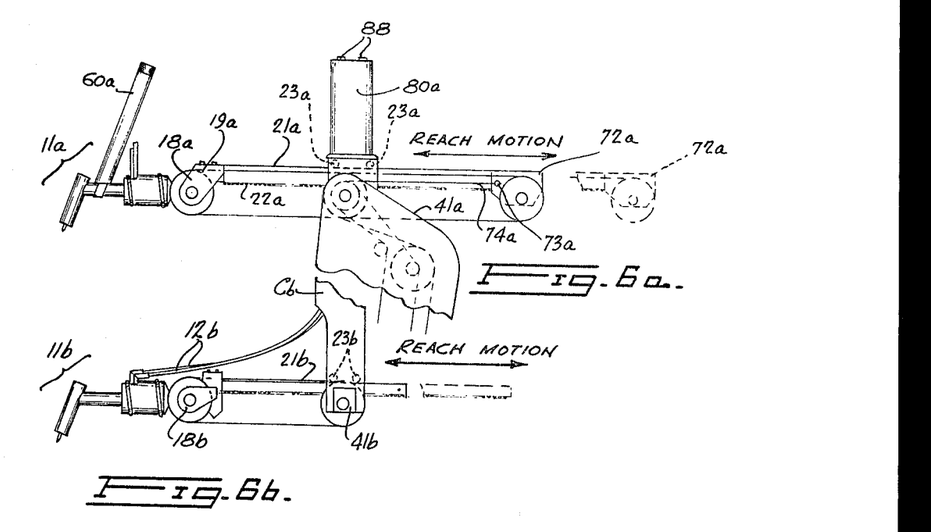
Figure 18:
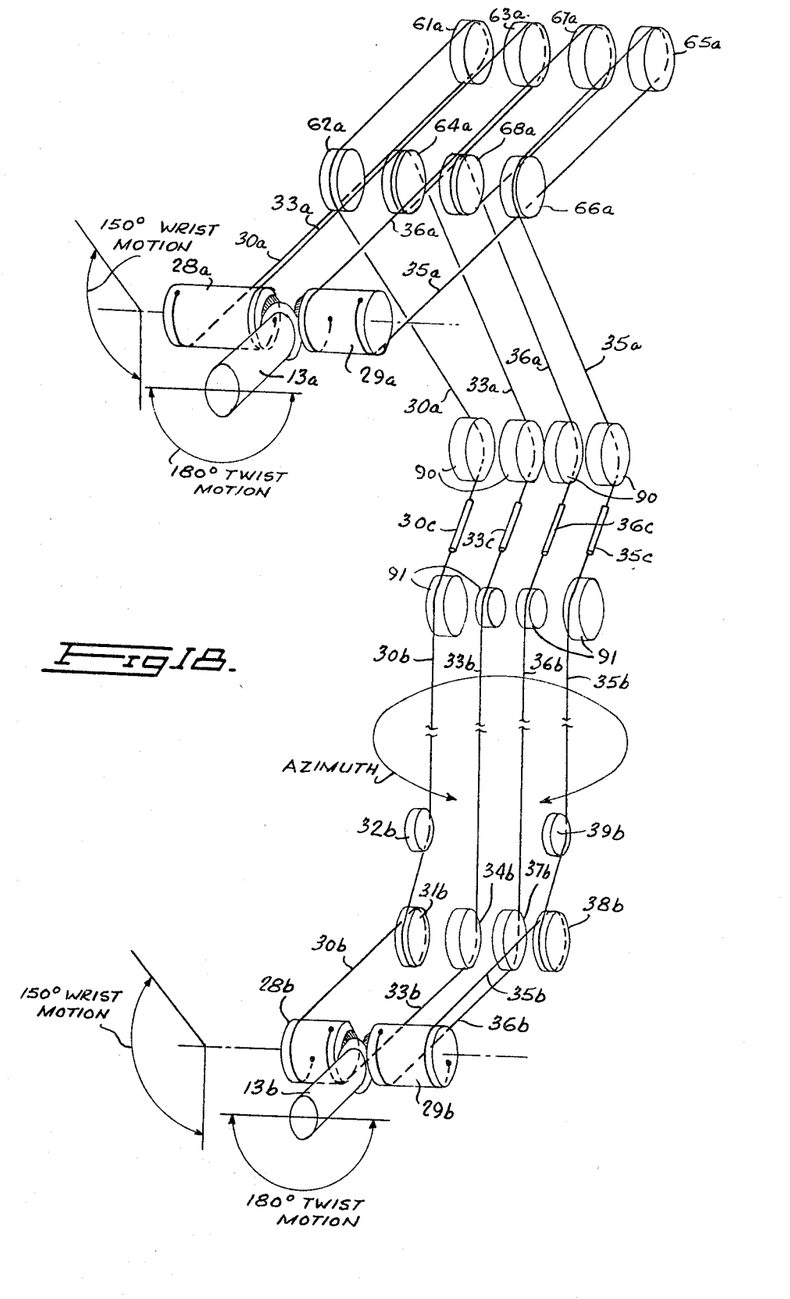
FIGURE 18 is a diagrammatic representation of the overall cable system also demonstrating the twist, wrist and azimuth motions.
Figure 19:
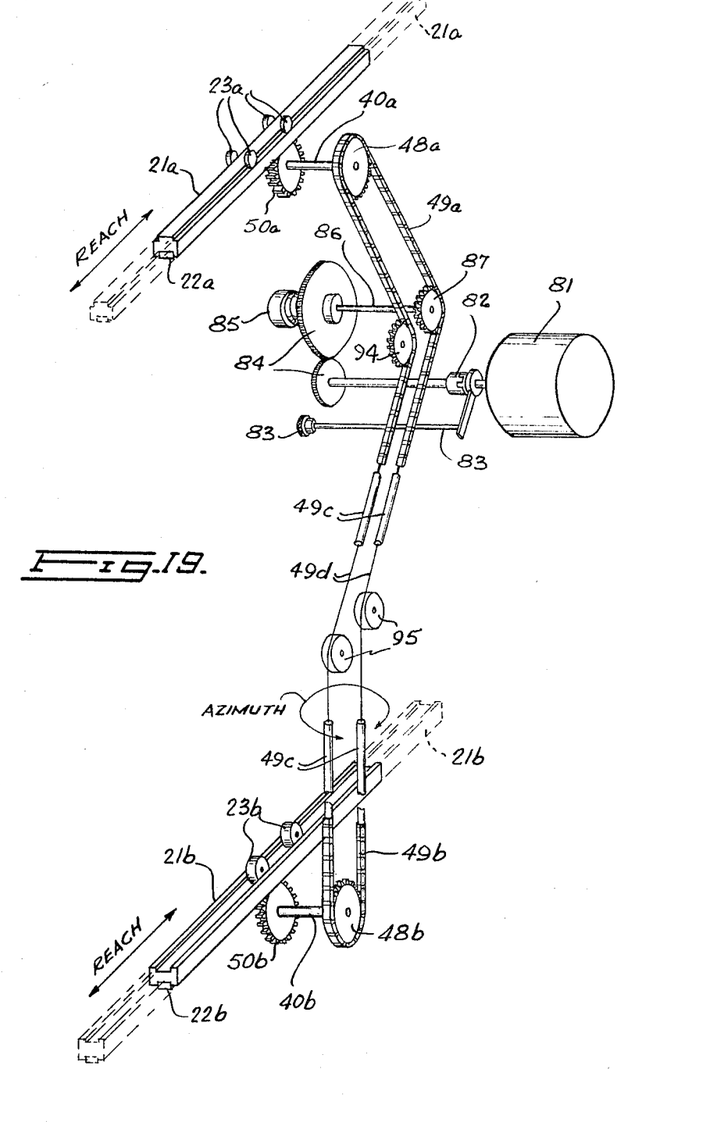
FIGURE 19 is a partial diagrammatic representation of the two units demonstrating the reach motion.
Figure 20:
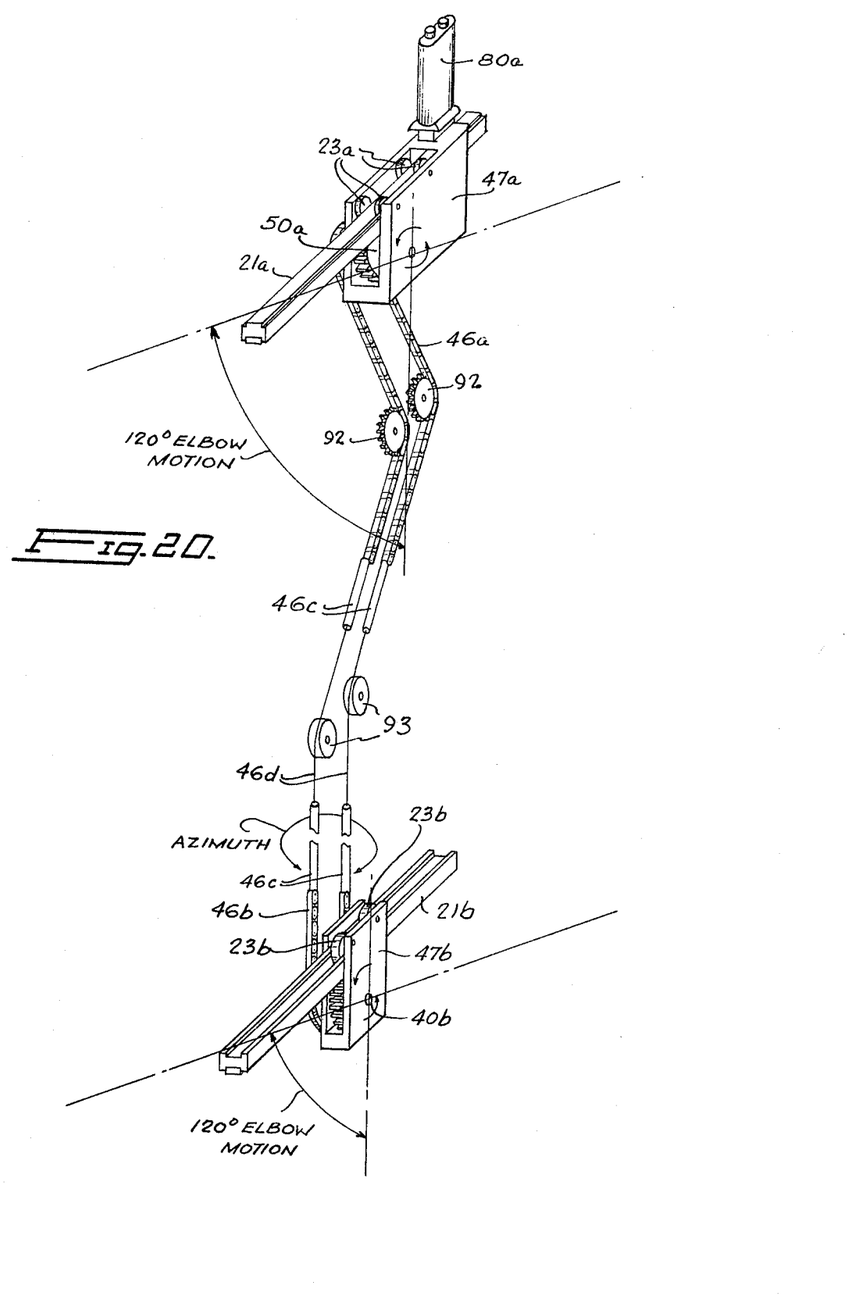
FIGURE 20 is a similar partial diagram illustrating the elbow motion.

While FIGURES 18 to 20 show the motions diagrammatically and provide a ready means for quick comprehension of their general nature, reference needs to be made to other views for a full understanding of all structural considerations. For example, in FIGURE 6b which shows the reach motion, it will be observed that the supply cables 12b are extended from the casing Cb. The manner in which these cables are raised and lowered in the casing Cb for this purpose will be explained below. Structural considerations relating to the elbow motions are demonstrated by FIGURE 7b. The full line position seen in FIGURE 7b shows the head 11b in maximum depression, and illustrates entry of the slider 21b into the rear of the casing Cb which is cut away at 55b for this purpose. The broken line position shows maximum elevation of the head 11b during the elbow motion.

The wrist motion is shown structurally in FIGURE 8b, again in maximum depression in full lines and maximum elevation in broken lines. One extreme of the twist motion is shown structurally in FIGURE 9b.

Figures 4, 5, 17:
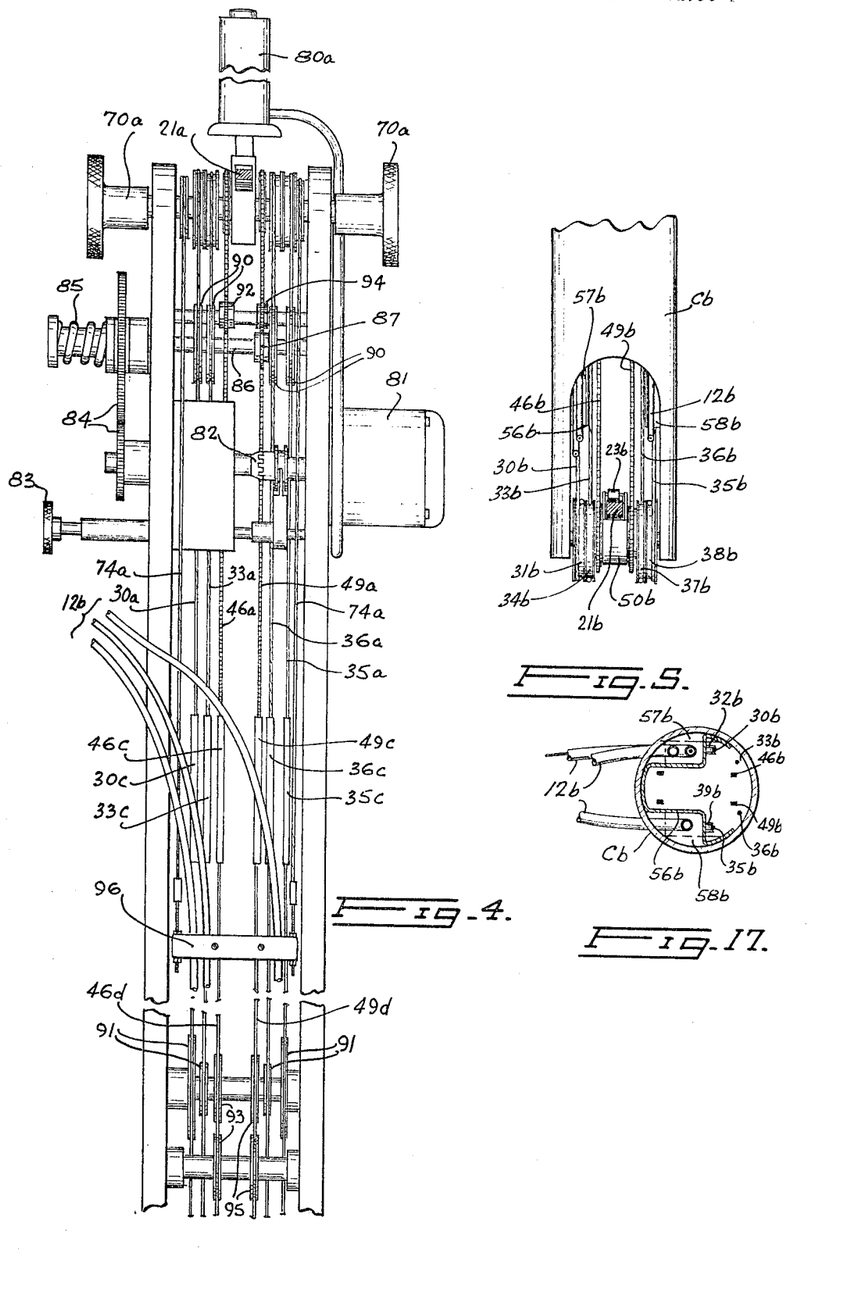
FIGURE 4 is a view taken on the line IV—IV in FIGURE 2.
FIGURE 5 is a sectiona taken on the line V—V in FIGURE 3.
FIGURE 17 is a section on the line XVII—XVII in FIGURE 3.

The relative positions of the chains and cables in the casing Cb are best appreciated from FIGURES 5 and 17 which also show an internal casing partition and support member 56b which defines passageways 57b and 58b along which the supply cables 12b extend and which supports the pulleys 32b and 39b.

*Master unit structure*

The master unit A is arranged for manual manipulation (with power assist for the reach motion, as will be later described) to perform the same motions as the slave unit. Many of the parts of the slave unit are duplicated in the master unit and, where appropriate, these parts have been given the same numerical designation but with the suffix *a* instead of *b*.

Figure 2:
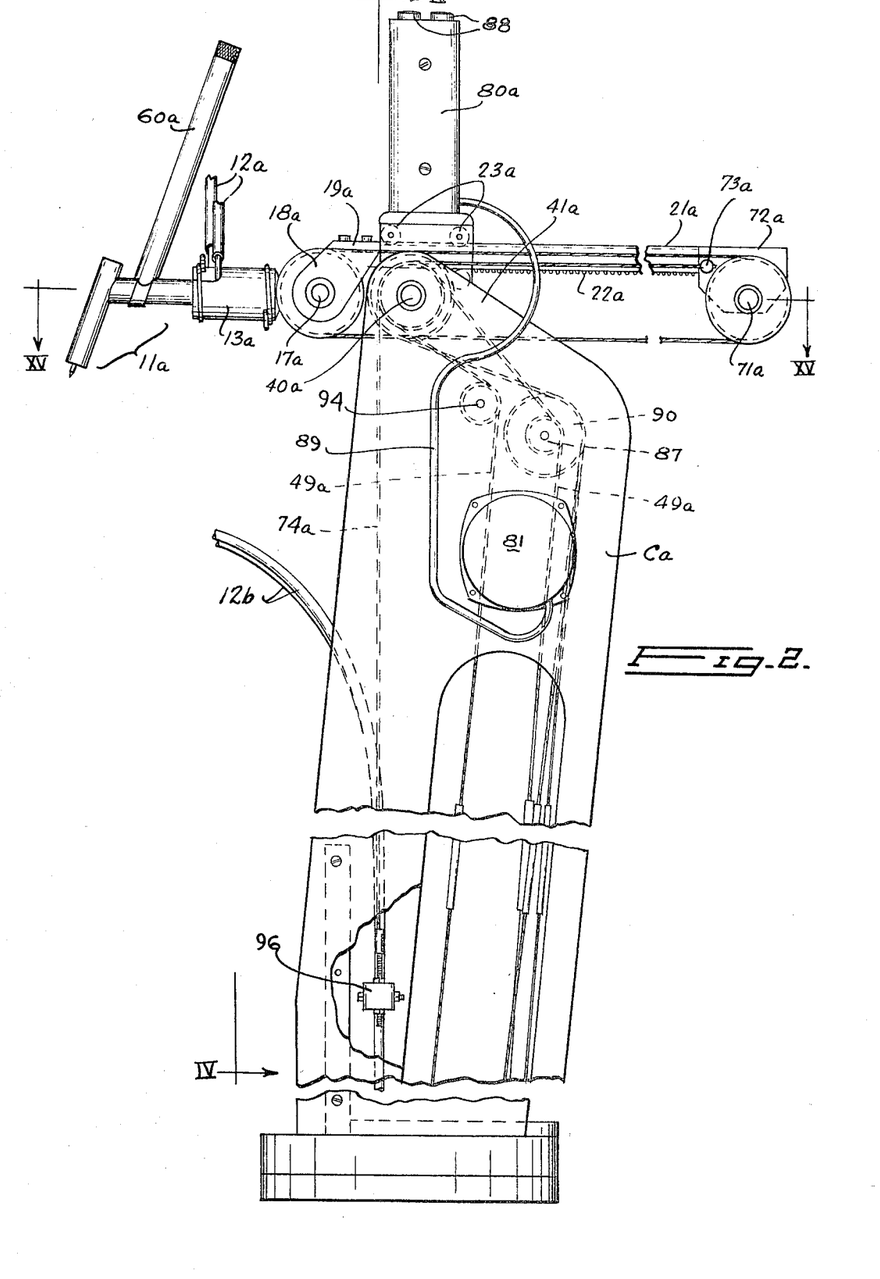
FIGURE 2 is a side view of the master unit of the apparatus.
Figure 15:
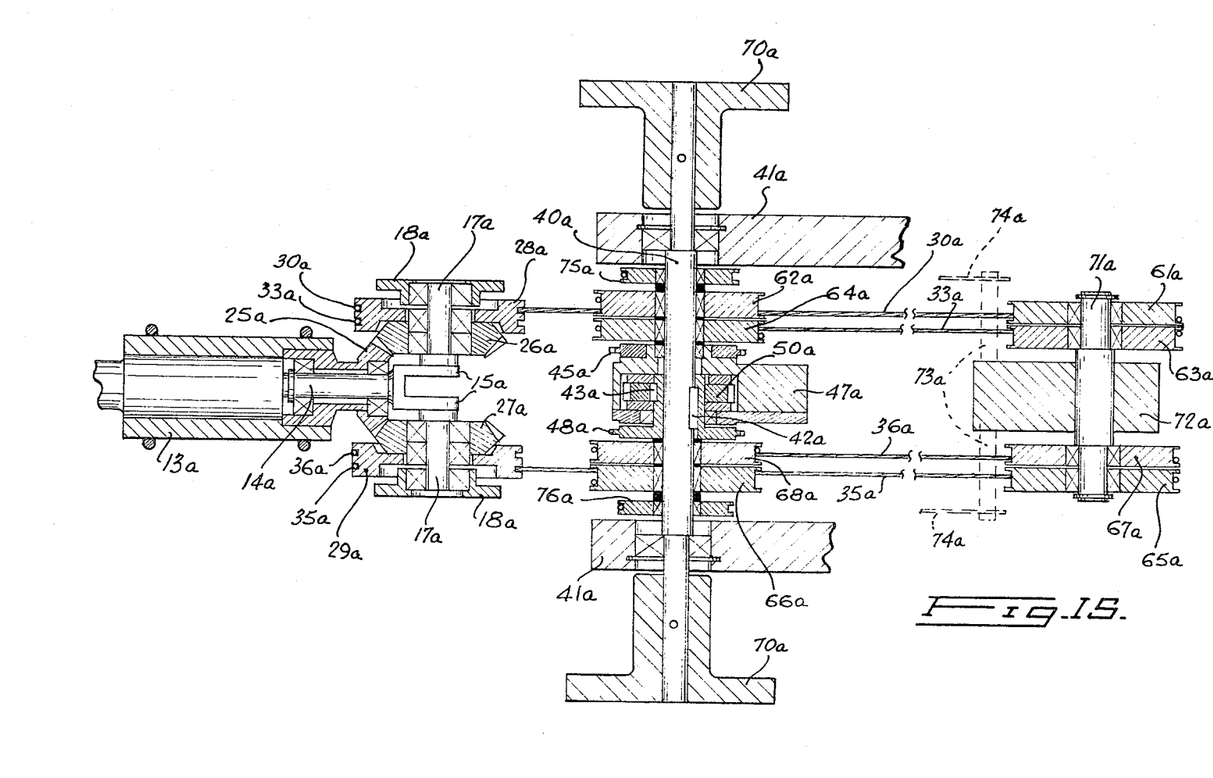
FIGURE 15 is a section taken on the line XV—XV in FIGURE 2.

Referring firstly to FIGURE 2, the master unit A is provided with a welding head 11a to which supply cables 12a are connected. The head 11a is mounted on an insulating mounting 13a and is controlled by a hand grip 60a. As best seen from FIGURE 15 the mounting 13a is pivotally supported on a stub shaft 14a which terminates in a forked end 15a supported by pins 17a extending inwardly from an outer casing structure 18a. Casing 18a is connected by a block 19a (FIGURE 2) to a slider 21a provided on its lower surface with a toothed rack 22a. The slider 21a engages rollers 23a with its upper surface. These parts are also seen in FIGURE 6a.

The insulating member 13a is provided at its end with a bevel pinion 25a (FIGURE 15) which meshes with a pair of bevel gears 26a and 27a pivotally mounted on the respective pins 17a. Secured to the gears 26a and 27a are discs 28a and 29a, respectively, each disc being formed with a pair of peripheral grooves arranged side by side. A first cable 30a is secured at one end to lie in the outer groove of the disc 28a and to extend around grooves in pulley discs 61a and 62a and finally towards the slave unit. See FIGURE 18. A second cable 33a is secured at one end to lie in the inner groove of the disc 28a, to extend around grooves in pulley discs 63a and 64a, and then towards the slave unit. As in the slave unit the cables 30a and 33a extend in opposite senses around the disc 28a. In a similar manner, cables 35a and 36a extend from the disc 29a around pulley discs 65a, 66a, 67a and 68a.

The pulley discs 62a, 64a, 66a and 68a are all freely and independently mounted on bearings on a pin 40a, the ends of which pin are supported in bearings in side plates 41a which form part of a casing part Ca. Hand grips 70a form keyed continuations of the pin 40a.

Freely rotatably mounted on the pin 40a is a first sprocket wheel 45a driving a chain 46a (see FIGURE 20). The sprocket wheel 45a is secured to a frame 47a which supports the rollers 23a, and the orientation of which is thus determined by the direction of extent of the slider 21a. Keyed to the pin 40a by a key 42a is a second sprocket wheel 48a driving a chain 49a (FIGURE 19), and keyed to the sprocket wheel 48a by a key 43a is a pinion 50a meshing with the rack 22a.

The pulley discs 61a, 63a, 65a and 67a are all freely and independently mounted on bearings on a pin 71a supported by a block 72a secured to the end of the slider 21a remote from the head 11a. Fixed rods 73a project laterally to each side from the block 72a to form anchors for a pair of cables 74a that extend over freely rotatable pulleys 75a and 76a on the pin 40a. The purpose of cables 74a is to provide for the travel of the slave unit supply cables 12b in a manner to be described below.

Master unit motions

The welding head 11a is capable of the same five motions as the slave unit, and these motions are imparted to the head 11a by manual manipulation of the hand grips 60a and 70a already described, and of a further hand grip 80a mounted to project upwardly from the frame 47a.

Figures 7A, 9A, 9B:
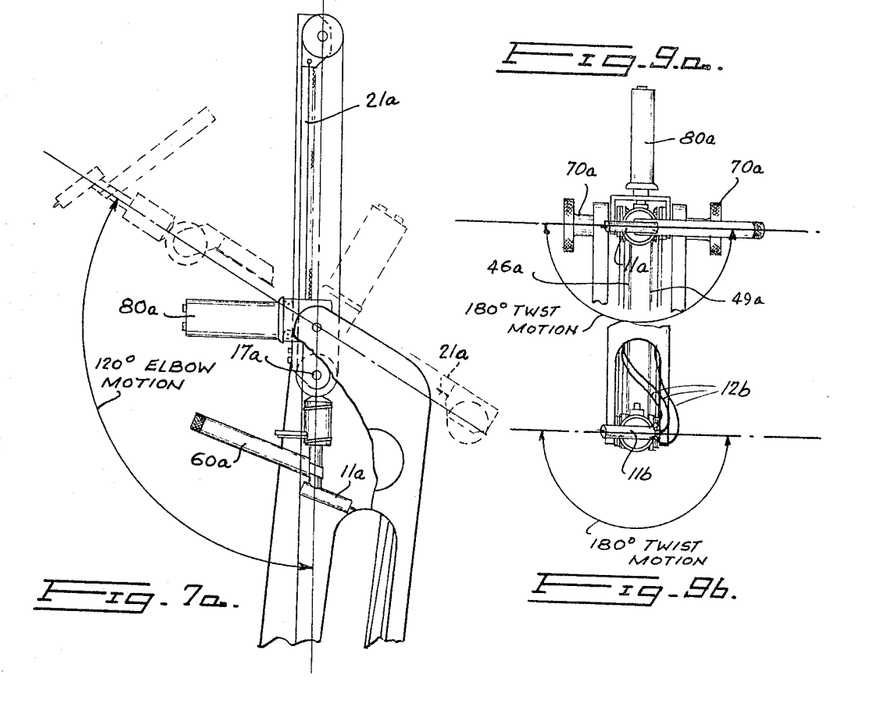
FIGURE 7a is a further side view of the master unit demonstrating the elbow motion thereof.
FIGURE 9a is a front view of the master unit demonstrating the twist motion thereof.
FIGURE 9b is a corresponding front view of the slave unit also demonstrating the twist motion thereof.
Figure 7B:
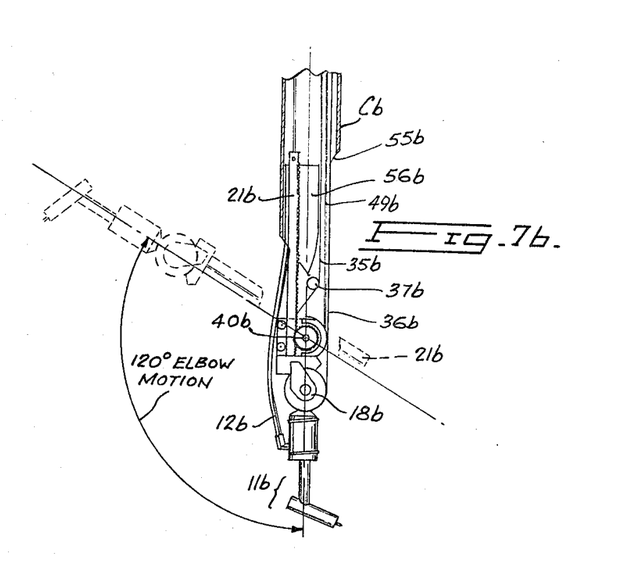
FIGURE 7b is a corresponding side view of the slave unit demonstrating the corresponding elbow motion thereof.

FIGURE 9a demonstrates the twist motion corresponding to that of the slave unit seen in FIGURE 9b. When so twisted the head 11a acts through gears 25a, 26a and 27a to tension cables 30a and 36a and to release tension in cables 33a and 35a. As shown diagrammatically in FIGURE 18 and structurally in FIGURE 4, these cables are connected by connectors 30c, 33c, 35c and 36c, respectively, to the corresponding slave cables 30b, 33b, 35b and 36b. The connectors serve to maintain tension in the cables, which pass over idler pulleys 90 and 91. Transfer of the tension conditions from the a cables to the corresponding b cables causes the head 11b to follow the twisting movement of the head 11a.

The wrist motion operates similarly (see FIGURE 8a), the motion again being transmitted through the four cables. The elbow motion (FIGURE 7a) is transmitted to the slave unit through chains 46a and 46b, these being joined together by two pairs of connectors 46c and intermediate cable portions 46d (FIGURE 20), these parts being guided by idler sprockets 92 and pulleys 93. The reach motion (FIGURE 6a) is transmitted to the slave unit through chains 49a and 49b that are joined together by two pairs of connectors 49c and intermediate cable portions 49d (FIGURE 19). Hand grips 70a may be turned manually to initiate or assist this motion. Azimuth rotation is transmitted directly through the casing sructure in a manner more fully described below.

The passing of the master unit cables 30a, 33a, 35a and 36a around the rearwardly located pulley discs 61a, 63a, 65a and 67a prevents these cables interfering with the reach motion. When the slave unit head 11b is fed forwardly (to the left in FIGURE 6b) all four cables must pay out. This effect is achieved by the corresponding shortening of the distance between pins 40a and 71a in the master unit. The shortening effect of the two spans of each cable which extend between pulley discs 61a, 63a, 65a and 67a and pulley discs 62a, 64a, 66a and 68a exactly compensates for the lengthening effect of the one span of each cable which extends between pulley discs 62a, 64a, 66a and 68a and discs 28a and 29a, and between pulley discs 31b, 34b, 37b and 38b and discs 28b and 29b.

Power assist

The reach motion is provided with a power assist in the form of a motor 81 (FIGURES 2, 4 and 19) driving through a clutch 82, operated by manual control 83, to gearing 84 and a slipping clutch 85, from which torque is transmitted through a shaft 86 to a spur wheel 87 engaging the chain 49a. Motor 81 is reversible and can be driven in either direction by depression of the appropriate one of a pair of push buttons 88 on the hand grip 80a, these buttons being connected to motor 81 by cable 89. Idler sprocket 94 and pulleys 95 are also employed to guide the chain 49a and its cable 49d.

Supply cables

The supply cables 12a for the master head 11a require no special consideration. Sufficient slack is provided to enable the operator to manipulate the head 11a to any desired position within the limits of travel of the various motions. The supply cables 12b for the slave head 11b quire additional slack when the units are extended in the reach motion. This requirement is provided for by securing the upper ends of cables 12b to a cross-bar 96 (FIGURES 2 and 4) suspended at the ends of cables 74a. Cross-bar 96 will thus rise and fall with retraction and extension of the master slider 21a to ensure corresponding movement of the supply cables 12b.

Casing construction

The upper casing portion Ca is rigidly connected to the lower inner casing portion Cb by a continuous tube Cc, these parts being contained in a stepped outer casing C. The upper casing portion Ca is pivotally mounted on bearings 100 (FIGURE 16) in a pedestal 101 which comprises a pair of relatively slidable tubes, an outer fixed tube 102 and an inner sliding tube 103. Tube 102 is secured to the structure 10 by fixing 104, and a member 103, which supports the bearings 100, can be moved up and down on the tube 102 engaging both the inner and outer surface thereof. In this way member 103 is fixed in the desired position relative to tube 102 in order to set the slave unit B in the required vertical orientation. This fixing is achieved by a collar 106 that rotates on the outer part of member 103 while being prevented from sliding therealong. The collar 106 is internally threaded and engages threads 107 on the tube 102. A bolt 108 extends inwardly from tube 102 to engage a vertical slot 109 in member 103 to prevent relative rotation between these parts. Casing C which surrounds the inner casing portion Cc and Cb below the pedestal 101 is secured to the structure 10 by fixing 105 in which it is permanently welded. In the particular structure shown, a number of casings C will be permanently installed, while the welding machine will only be introduced into one such casing as required. The inner tubular structure composed of portions Ca, Cc and Cb can be inserted into or withdrawn from the outer casing structure composed of pedestal 101 and casing C as required. The slave unit B is turned to the position shown in full lines in FIGURE 7b when this operation takes place.

Alternative tools

Figure 21:
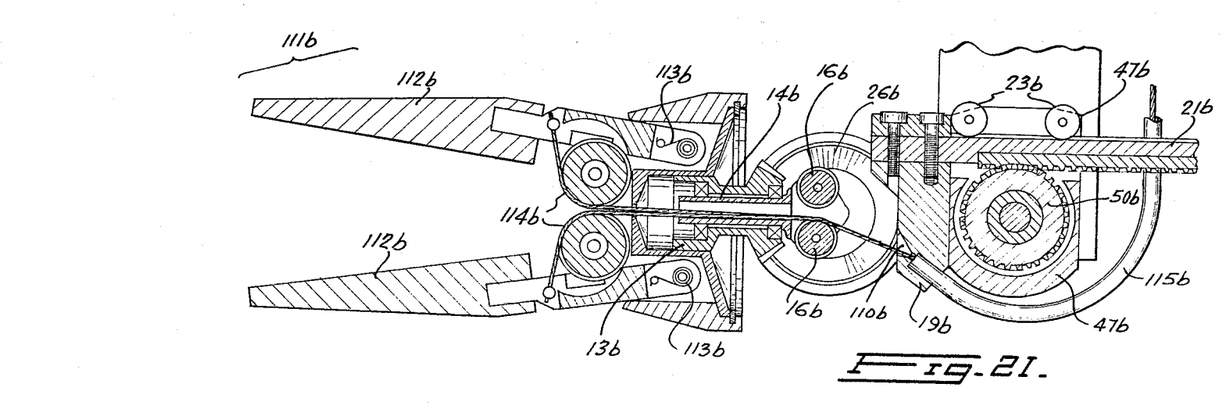
FIGURE 21 is a sectional view of a modified slave unit.
Figure 22:
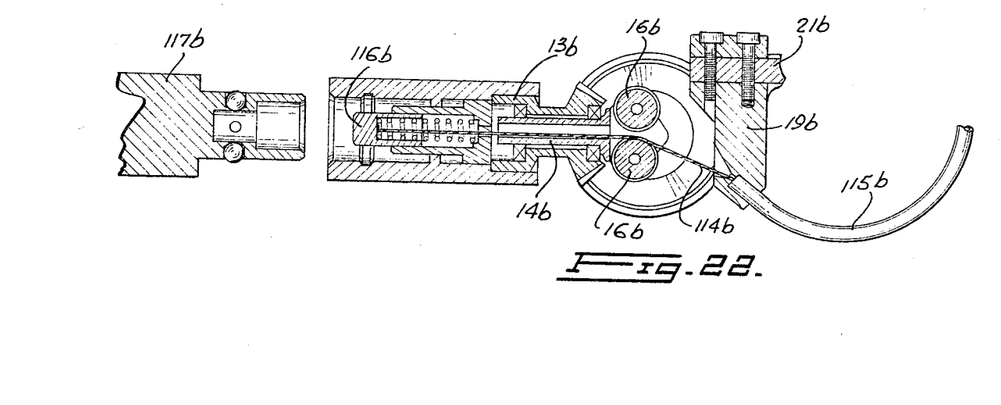
FIGURE 22 is a sectional view of yet another modified slave unit.

No function has so far been ascribed to the rollers 16b and a hole 110b in the block 19b shown in FIGURE 10. These parts are provided for the guidance of a cable should the same be required for the further manipulation of part of the tool mechanism. A practical example is furnished in FIGURES 21 and 22. FIGURE 21 shows the slave unit B fitted with a gripper 111b, the jaws 112b of which are closed against springs 113b by a pair of cable ends 114b that pass through the hollow stub shaft 14b between rollers 16b being spliced together to form a single cable passing through hole 110b into a sheath 115b secured at its end in the hole 110b. This type of tool might typically be used for the locating of components prior to the fitting of the welding head 11b for a welding operation. FIGURE 22 shows another similar arrangement in which a single cable 114b may be used to haul on a locking plunger 116b for the attachment and release of the base 117b of a tool (not further shown).

Figures 8A, 23:
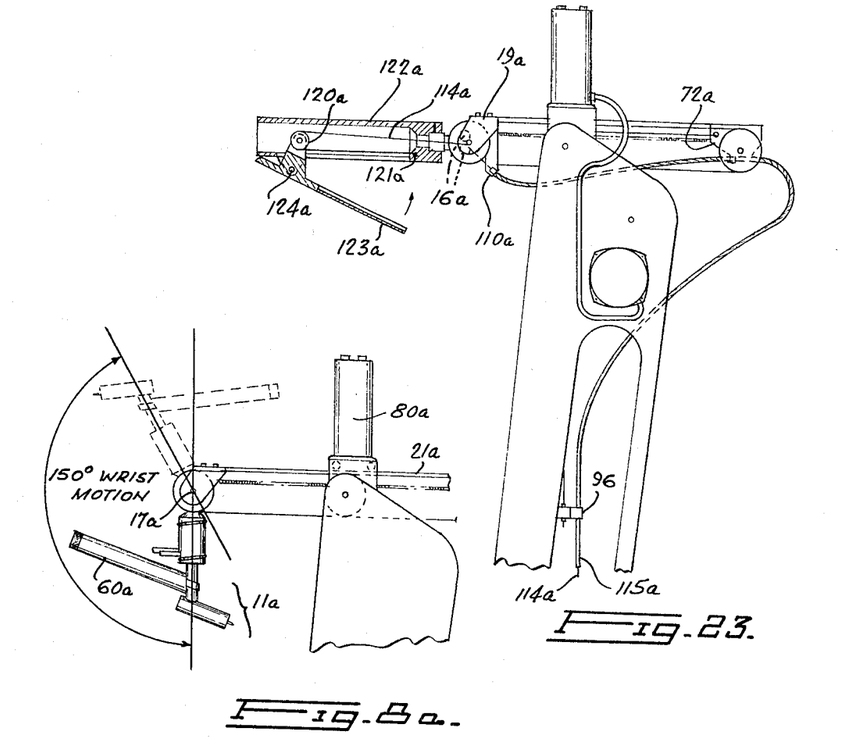
FIGURE 8a is a further side view of the master unit demonstrating the wrist motion thereof.
FIGURE 23 is a side view of a modified master unit for cooperation with the slave units of FIGURE 21 and 22.
Figure 8B:
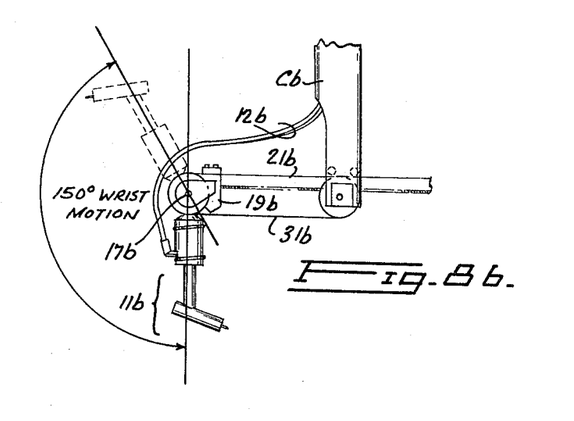
FIGURE 8b is a corresponding side view of the slave unit demonstrating the corresponding wrist motion thereof.

FIGURE 23 shows the modifications to the master unit needed to operate the cable 114b, the upper continuation of which is designated 114a with sheath 115a. Sheath 115a is clamped to cross-bar 96 and then to block 72a and finally terminates by being secured in hole 110a of block 19a. Cable 114a passes between rollers 16a and around a pulley 120a to be secured at 121a in a handle 122a. A tong lever 123a is pivoted at 124a to the handle 122a and supports the pulley 120a so that movement of the lever 123a towards the handle 122a will tension the cable and operate the slave tool shown in FIGURE 21 or 22.

We claim:

1. A remote control manipulator comprising a master unit, a slave unit and means for mounting said units on a fixed structure, each said unit comprising
   (a) a first frame member and means pivotally mounting said first frame member on the fixed structure to turn about a first axis,
   (b) a second frame member and means pivotally mounting said second frame member on said fiirst frame member to turn about a second axis generally perpendicular to said first axis,
   (c) an elongated slider and means mounting said slider on said second frame member for longitudinal movement relative thereto, the direction of said longitudinal movement extending generally perpendicularly to said second axis,
   (d) a support member and means pivotally mounting said support member on an end of said slider to turn about a third axis generally parallel to said second axis,
   (e) a tool head and means pivotally mounting said head on said support member to turn about a fourth axis generally perpendicular to said third axis.
   (f) means extending in the direction of said first axis interconnecting the respective first frame members of each of said units for rotation in unison about said first axis,
   (g) means sensitve to rotation of the second frame member of the master unit about its said second axis, and means driven by said sensitive means for rotating the second frame member of the slave unit about its said second axis in unison with the second frame member of the master unit.
   (h) means sensitive to longitudinal travel of the slider of the master unit, and means driven by such last-mentioned sensitive means for moving the slider of the slave unit in unison with the slider of the master unit.
   (i) wherein said means (h) comprise a sprocket wheel mounted on each of the first frame members to turn freely about a respective second axis, a spur wheel connected to each sprocket wheel, a rack extending along each slider and meshing with a respective spur wheel, and a chain extending in a closed loop around said sprocket wheels to drivingly interconnect the same,
   (j) means sensitive to rotation of the support member of the master unit about its said third axis, and means driven by such last-mentioned sensitive means for rotating the support member of the slave unit about its said third axis in unison with the support member of the master unit,
   (k) and means sensitive to rotation of the tool head of the master unit about its said fourth axis, and means driven by such last-mentioned sensitive means for rotating the tool head of the slave unit about its said fourth axis in unison with the tool head of the master unit.

2. A remote control manipulator according to claim 1, wherein said means (g) comprise a sprocket wheel mounted on each of the second frame members coaxially with a respective second axis and a chain extending in a closed loop around said sprocket wheels to drivingly interconnect the same.

3. A remote control manipulator according to claim 1, wherein said means (j) and (k) comprise a pair of sun wheels mounted on each of said slider ends to turn freely about a respective one of said third axes, a planet wheel mounted on said support member and meshing with each said pair of sun wheels whereby synchronous rotation of said sun wheels in the same direction corresponds to rotation of the associated support member about its third axis and synchronous rotation of said sun wheels in opposite directions corresponds to rotation of the associated tool head about its fourth axis.

4. A remote control manipulator according to claim 3, including a pair of cable means interconnecting each sun wheel of the master unit with the respective sun wheel of the slave unit, the respective cable means of each pair being secured to their associated sun wheel to rotate the same in opposite directions, all four cable means extending over pulley means between the second frame members of said master and slave units, said pulley means including pulleys mounted at the end of one of said sliders remote from the support member mounted on such slider whereby each said cable means extends around a said pulley with a double span thereof extending between the pulley and the associated second frame member and a single span thereof extending between each sun wheel and the second frame member of each unit to maintain uniform tension in said cable means notwithstanding longitudinal movement of said sliders.

5. In a remote control manipulator apparatus having a master unit, a slave unit and means for mounting said units on a fixed structure and for interconnecting said units for synchronous operation, each said unit including
   (a) frame means, an elongated slider and means mounting said slider on said frame means for longitudinal movement relative thereto,
   (b) a support member and means pivotally mounting said support member on a first end of said slider to turn about an axis generally transverse to said longitudinal movement,
   (c) a pair of sun wheels mounted on each of said slider ends to turn freely about said axis and a planet wheel mounted on said support member and meshing with said sun wheels,
said apparatus including
   (d) a pair of cable means interconnecting each sun wheel of the master unit with the respective sun wheel of the slave unit, the respective cable means of each pair being secured to their associated sun wheel to rotate the same in opposite directions,
   (e) all four cable means extending over pulley means between the frame means of said master and slave units, said pulley means including pulleys mounted at the second end of one of said sliders whereby each cable means extends around a said pulley with a double span thereof extending between the pulley and the associated frame means and a single span thereof extending between each sun wheel and the frame means of each unit to maintain uniform tension in said cable means notwithstanding longitudinal movement of said sliders,
said apparatus further including
   (f) means sensitive to longitudinal travel of the slider of the master unit, and means driven by such last-mentioned sensitive means for moving the slider of the slave unit in unison with the slider of the master unit,
   (g) wherein said means (f) comprise a sprocket wheel mounted on each of the first frame members to turn freely about a respective axis, a spur wheel connected to each sprocket wheel, a rack extending along each slider and meshing with a respective spur wheel, and a chain extending in a closed loop around said sprocket wheels to drivingly interconnect the same.

6. A remote control manipulator apparatus comprising a master unit, a slave unit and means for mounting said units on a fixed structure, each unit including frame means, a tool head and means mounting said tool head for a twist motion about a first axis, a wrist motion about a second axis perpendicular to said first axis, reach motion comprising longitudinal travel in the direction of said first axis relative to said frame means, an elbow motion about a third axis fixed in location relative to said frame means and extending parallel to said second axis, and an azimuth motion comprising rotation of said frame means about a fourth axis perpendicular to said third axis, said apparatus including means interconnecting said units for ensuring that each of said motions applied to the tool head of said master unit is followed faithfully by the tool head of said slave unit, wherein each said unit includes an elongated slider and means mounting said slider on said frame means for longitudinal movement relative thereto, means sensitive to longitudinal travel of the slider of the master unit, and means driven by such last-mentioned sensitive means for moving the slider of the slave unit in unison with the slider of the master unit, wherein said last-mentioned sensitive means and said means driven thereby comprise a sprocket wheel mounted on each of the frame members to turn freely about a respective said third axis, a spur wheel connected to each sprocket wheel, a rack extending along each slider and meshing with a respective spur wheel, and a chain extending in a closed loop around said sprocket wheels to drivingly interconnect the same.

References Cited by the Examiner

UNITED STATES PATENTS

| | | | |
|---|---|---|---|
| 2,695,715 | 11/1954 | Goertz et al. | 214—1 |
| 2,861,701 | 11/1958 | Bergsland et al. | 214—1 |
| 3,095,096 | 6/1963 | Chesley | 214—1 |
| 3,111,230 | 11/1963 | Pesenti | 214—1 |

GERALD M. FORLENZA, *Primary Examiner.*

R. G. SHERIDAN, *Assistant Examiner.*